(No Model.)
C. R. HUNT.
STEAM AND WATER MOTOR.
No. 403,430. Patented May 14, 1889.
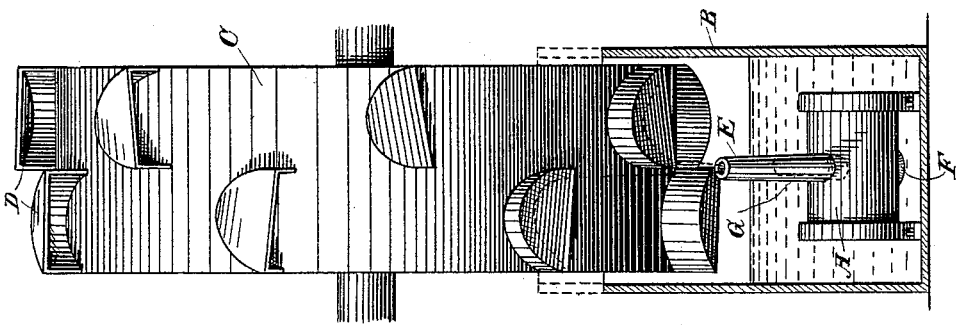
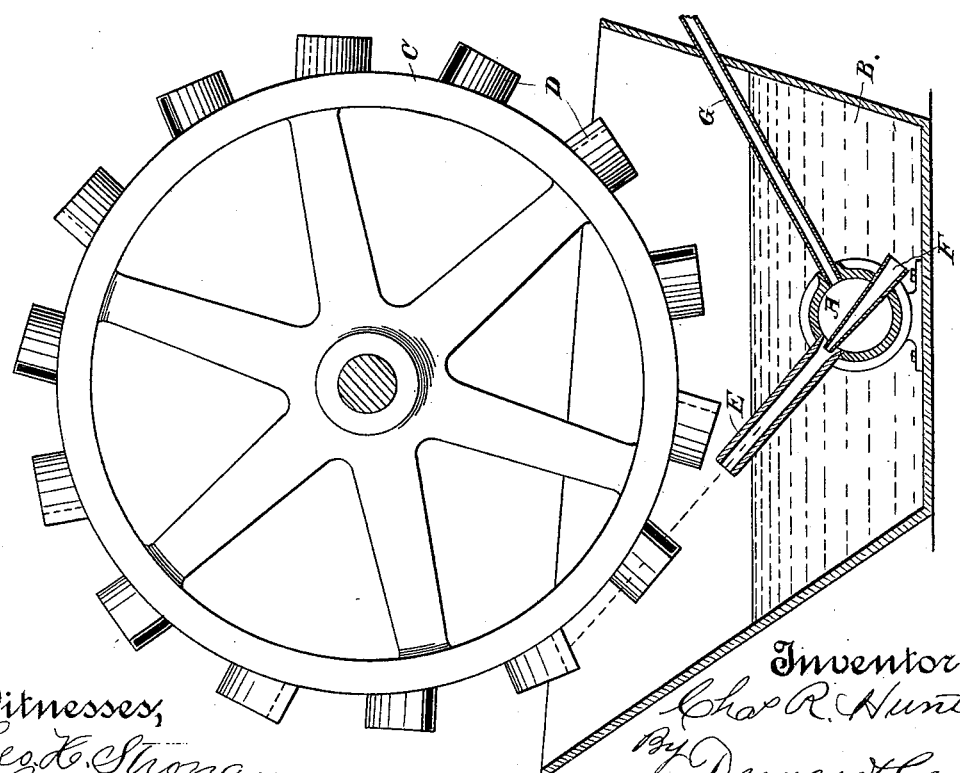
Witnesses:
Geo. H. Strong
J. H. Touzer
Inventor,
Chas. R. Hunt
By Dewey & Co.
Attys

UNITED STATES PATENT OFFICE.

CHARLES R. HUNT, OF REDDING, ASSIGNOR OF ONE-HALF TO CHARLES K. McELWEE, OF AUBURN, CALIFORNIA.

STEAM AND WATER MOTOR.

SPECIFICATION forming part of Letters Patent No. 403,430, dated May 14, 1889.

Application filed November 30, 1888. Serial No. 292,320. (No model.)

*To all whom it may concern:*

Be it known that I, CHARLES R. HUNT, of Redding, Shasta county, State of California, have invented an Improvement in Steam and Water Motors; and I hereby declare the following to be a full, clear, and exact description of the same.

My invention relates to a device which I call a steam and water motor.

It consists of a chamber submerged in a tank of water, above which is journaled a wheel having buckets upon its periphery, a jet pipe or tube extending from said chamber upwardly, so as to discharge into the buckets upon the wheel, a suction tube or pipe in line with the first and opening rearwardly through the side of the chamber into the water in the tank, and a steam-pipe opening into the chamber, so as to discharge from the first-named nozzle in such a manner as to draw water through the suction-pipe and discharge it with the steam into the buckets on the wheel.

It also consists in the improved construction of the buckets upon the wheel.

Referring to the accompanying drawings for a more complete explanation of my invention, Figure 1 is a vertical section taken through the tank, the chamber, and the pipes, showing also part of the wheel. Fig. 2 is an edge view of the wheel, showing the relative arrangement of the buckets and the nozzle.

A is a chamber, which may be of any suitable shape. In the present case I have shown it in the form of a cylinder horizontally placed and secured by bolts or otherwise in the bottom of the tank B, which is of sufficient size to contain a considerable quantity of water. Above this tank is supported a hurdy-gurdy or momentum-wheel, C, so that the buckets D upon its periphery pass into the upper portion of the tank B during the revolution of the wheel.

E is a nozzle extending outwardly and upwardly from one side of the chamber A, and so placed with relation to the wheel that it discharges into the buckets D upon the periphery of the wheel. Into the opposite side of the chamber A is fixed a second pipe, F, so that its axis is in line with that of the pipe E. This pipe F is of somewhat smaller diameter where it enters the rear portion of the pipe E, so that an annular space or channel is left around the end of the pipe F and between it and the rear of the pipe E.

G is a steam-pipe, connected with a boiler or any suitable source of supply, by which steam under pressure is admitted into the chamber A.

The operation of this device will then be as follows: Steam being admitted through the pipe G passes out with great velocity through the pipe E, and by reason of the partial vacuum thus produced in the pipe F the water which is contained in the tank B in sufficient quantity to submerge the chamber A is drawn in through the pipe F and discharged with the stream through the nozzle E directly into the buckets on the wheel above, so as to impart a high velocity to the wheel.

In order to obtain the best effects from the water and steam, the buckets are formed, as shown in Fig. 2, of a semicircular or parabolic section, being secured to the rim of the wheel upon each side of the center, so that the buckets on one side alternate with or lie between the buckets upon the opposite side. By this construction the inner edges of the buckets may be made as thin and sharp as may be desirable, and the interior of the buckets are perfectly polished, so as to present as little surface for friction as possible. The jet striking into the buckets exerts its force to propel the wheel, and as it passes around the curve is immediately discharged from the outside edge, and the water returns into the tank B, so that a small quantity of water can be used over and over. The reactionary force of the water assists to impel the wheel, and it also returns the water instantly to the tank as soon as its work is done, so that it may be used over and over. By alternating the buckets, or placing those upon one side slightly behind those upon the other, the action of the jet of steam and water becomes more continuous than if the buckets were placed side by side.

Having thus described my invention, what I claim as new, and desire to secure by Letters Patent, is—

The combination of the water-tank, the chamber A, submerged therein, the suction-pipe passing through the chamber and communicating with the contents of the tank, the discharge-nozzle into which the suction-pipe discharges, a steam-jet tube discharging into an annular space between the end of the suction and nozzle, and a rotary wheel having buckets upon its rim into which the jet discharges, said wheel having its lower portion within the tank, whereby the water discharged from the buckets returns to the tank, substantially as herein described.

In witness whereof I have hereunto set my hand.

CHARLES R. HUNT.

Witnesses:
S. H. NOURSE,
H. C. LEE.